United States Patent [19]

Kennedy et al.

[11] Patent Number: 4,568,732

[45] Date of Patent: Feb. 4, 1986

[54] CONTINUOUS TELECHELIC POLYMER PROCESS

[75] Inventors: Joseph P. Kennedy; Rudolf Faust; Ágota Fehérvári, all of Akron, Ohio

[73] Assignee: The University of Akron, Akron, Ohio

[21] Appl. No.: 689,828

[22] Filed: Jan. 9, 1985

[51] Int. Cl.$^4$ .............................................. C08F 2/14
[52] U.S. Cl. ..................................... 526/206; 526/237
[58] Field of Search ................................. 526/206, 237

[56] References Cited

U.S. PATENT DOCUMENTS 4,276,394  6/1981  Kennedy .............................. 526/237
4,327,201  4/1982  Kennedy .............................. 526/237

*Primary Examiner*—Paul R. Michl

*Attorney, Agent, or Firm*—Oldham, Oldham & Weber Co.

[57] ABSTRACT

Novel telechelic halogenated polymers of cationically polymerized olefin monomers are formed carrying from 2 to about 6 terminal halogens by a continuous polymerization method. The continuous polymerization method being achieved by feeding to a stirred reactor a first stream composed of a solvent solution of at least one monomer and an inifer and another stream composed of a solvent solution of boron chloride to effect the polymerization of said monomer to a telechelic halogenated polymer product and withdrawing the reaction product from said reactor essentially in amounts equal to that of the sum of the two streams with the feeds to said reactor being simultaneously and continuously fed thereto while maintaining the temperature in the range of minus 10° to minus 80° C.

19 Claims, 2 Drawing Figures

CONTINUOUS TELECHELIC POLYMER PROCESS

TECHNICAL FIELD

The present invention relates to a continuous process for producing or synthesizing novel telechelic or terminally functional polymers such as terminally chlorinated polyisobutylenes or related polymers where the monomer contains from 4 to about 12 carbons in the olefin. More specifically, this invention is directed towards a continuous process for producing synthetic novel telechelic polymers such as terminally chlorinated polyisobutylenes which are relatively free of unfired and once-fired end groups and has essentially uniform polymer block lengths. This process is useful in producing novel diblock and triblock copolymers and other compositions which are relatively free of unfired and once-fired end groups. Thus, it has more uniform chain links and can react to give uniform derivatives.

BACKGROUND ART

It is well known to prepare telechelic polymers as shown by U.S. Pat. No. 4,276,394. Since this is a thermoplastic elastomer, it generally involves preparing diblock copolymers having a rubber segment and a plastic segment, at least one of which remains nonterminated and reactive. Although the above referred to U.S. Pat. No. 4,276,394 taught how to prepare these telechelic polymers, they were prepared by essentially a batch process and therefore the molecular weight of the resulting polymer was relatively wide and had molecules that had varying molecular weight and contained unfired and once-fired end groups.

DISCLOSURE OF INVENTION

It is a principal aspect of the present invention to provide a process for synthesizing telechelic halogenated polymers formed from cationically polymerizable olefin monomers having from about 4 to about 12 carbon atoms and carrying at least two terminal halogen terminii in a continuous manner.

It is a further aspect of the present invention to provide a method of synthesizing telechelic trihalogenated polymers of polyisobutylene wherein the end groups are essentially uniform and the length of the monomer blocks and the various chains is essentially uniform.

It is a still further aspect of the present invention to provide a novel method of preparing telechelic trihalogenated polymers in the star pattern.

These and other aspects, together with the advantages thereof over the prior art, which shall become apparent from the specification which follows, are accomplished by the invention that is hereinafter described and claimed.

As used herein, telechelic is indicative of terminal functionality. The telechelic polymers and prepolymers of the present invention are prepared with inifers and have from 2 to about 6 polymer arms, each of which has polymerized from what will be described as the inifer residue and carries an identical functional terminus. The functional sites carried by the inifer are eventually carried by the telechelic polymer. Hence, a difunctional inifer gives rise to a telechelic difunctional polymer and a trifunctional inifer gives rise to a telechelic trifunctional polymer-tristar polymer. Insofar as the functionalities of the inifer are identical, the inifer and resulting polymer are symmetric and similarly, where the functionalities differ, the inifer and polymer are asymmetric. The present invention is more specifically directed to work with symmetric inifers.

The inifer, short for initiator-transfer agent, not only provides for the controlled initiation and propagation of the polymerization reaction, which many initiators do, but in addition can and does function effectively in the important step of chain transfer. Chain transfer agents are known and are utilized to receive available carbenium ions in exchange for ions, usually halide, that they carry. The rate of transfer to the chain transfer agent must be favored over the rate of transfer to the monomer in order for the chain transfer agent to be useful and the synthesis of telechelic polymer successful.

Inasmuch as the inifer residue is relatively small when compared to the number average molecular weight of each polymer arm, the latter ranging from about 500 to about 50,000, its presence can be disregarded for purposes of theoretical discussion herein. Therefore, the molecular weight of a linear polyisobutylene will range from 1,000 to 100,000 while that of a polyisobutylene tristar will range from 1,500 to 150,000.

In general, the process of the present invention for synthesizing a telechelic polymer comprises the steps of charging simultaneously and continuously at least two feed streams to a suitable stirred reactor and withdrawing from said reactor a stream of product substantially and essentially of the same volume as the two streams being fed to the reactor. The two streams will be referred to as a first and a second stream. The first stream is composed of a solvent solution of at least one monomer, preferably isobutylene, sometimes abbreviated herein as IB, and an inifer. The second stream is composed of a solvent solution of a catalyst, such as boron chloride or an alkyl aluminum chloride compound to effect polymerization of said monomer to a telechelic halogenated polymer product. The feed to the reactor is withdrawn from the reactor as a reaction or polymerization product stream essentially in an amount equal with the amount of the two feed streams to said reactor and the temperature is maintained by a suitable cooling means either precooling the charged stocks or by use of suitable heat exchange means associated with the reactor.

The preferred inifer employed is p-di[2-chloro-2-propyl]benzene also commonly referred to as paradicumyl chloride and abbreviated pDCC. The polymer resulting from this invention comprises a polyisobutylene chain where the monomer is isobutylene having the inifer residue in the center. Practically, this polymer can also be thought of as a symmetrical dihalogenated polymer when the inifer is a binifer. A trinifer such as 1,3,5-tri[2-chloro-2-propyl benzene] commonly called tricumyl chloride or TCC produces a polymer that is frequently referred to as a three-arm star polyisobutylene. Prior U.S. Pat. No. 4,276,394 sets forth the theory and mechanism wherein telechelic polymers are produced by going through the phases of ion generation, cationation, chain transfer to monomer, and chain transfer to organic halides. The discussion and teaching in our foresaid patent is specifically incorporated herein as an aid in understanding the discussion of our invention and to supplement this disclosure.

In addition to p-dicumyl chloride, m-dicumyl chloride has also been found to be an effective inifer for the formation of telechelic polymers. These and other inifers that can be utilized for practice of the present invention have the general formula $AY_n$. The A component of the inifer can be an aromatic moiety, having 1 to about 4 phenyl rings either noncondensed such as phenyl, biphenyl or terphenyl, or condensed such as naphthalene, anthracene, phenanthrene or pyrene. The Y component is represented by the formula

wherein R and R' can be hydrogen, methyl or phenyl and R and R' can be the same and X is F, Cl or Br, and, n is an integer from 2 to 6. The aromatic carbons of A, not carrying Y can carry hydrogen/or small alkyl groups having 1 to about 4 carbon atoms.

In addition to aromatic moieties, A can also be aliphatic such as a linear or branched chain having from 3 to about 20 carbon atoms. Although Y is again represented by the formula

wherein R and R' can be hydrogen, methyl or phenyl, there is here the exception that at least one of the groups must be phenyl, in order that the halogen, X be benzylic. The halogens X and number of Y groups n are the same as set forth hereinabove. The aliphatic carbons of A not carrying Y or alkyl branches will carry hydrogen.

A second class of inifers that can be employed are small hydrocarbon molecules having not more than about 15 to 20 carbon atoms which can be represented by the formula BZ. B is a functional group which survives cationic polymerization conditions by virtue of being of relatively low cationic activity. Three such groups would be vinyl, a hydrocarbon substituted with silane groups thereon, and dicyclopentadienes. Z can be a tertiary halogen, the halogen being F, Cl or Br. These halogens are able to initiate cationic polymerization in the presence of $BCl_3$ or an alkylaluminum halogen compound.

These inifers are asymmetric, as compared to those having the formula $AY_n$, and will give rise to a polymer such as polyisobutylene having a vinyl, a silane or a dicyclopentadienyl end group and a benzylic, tertiary or allylic halogen end group. In subsequent reactions, with these polymers, each group can be treated separately to yield products other than would be obtainable with the $AY_n$ inifers which can be considered to be symmetric inifers in the sense that all end groups of the polymer arms will cary the same terminus.

Other inifers which cannot be described by either formula include homopolymers of alphachlorostyrene and/or 2-chloropropene and copolymers thereof with other hydrocarbons. With respect to these monomers, an oligomer of 2 to 6 units is formed from which 2 to 6 polyisobutylene chains can be attached each terminated by the halogen X which can be F, Cl or Br.

It should therefore be appreciated that both symmetric and asymmetric compounds are included within the group of inifers disclosed herein and that the selection of either will depend upon the polymer product desired just as the number of halogen containing groups can vary from 2 to 6 and will, in turn, determine the number of polymer arms that will polymerize from the inifer.

The effect of inifer concentration is inversely proportional to the molecular weight of PIB as is discussed in greater detail hereinbelow. In general, however, we have found a concentration of from about $10^{-4}$ moles to about $10^{-1}$ moles per mole of isobutylene monomer to be preferred and will yield PIB of useful molecular weights, although a milder range say $10^{-5}$ to $10^1$ may be desired in some instances.

The effect of temperature and various solvents are also discussed hereinbelow, however, for present purposes it can be said that the polymerization of isobutylene monomer with p-dicumyl chloride can be conducted at a temperature range of from about minus 10° C. to about minus 78° C. and in a polar solvent such as methylene chloride or solvent mixture. Polymerizations are conducted over a period to give a residence time ranging from about 1 minute to 1 hour with 10 minutes being preferred in our experimental setup. In order for the inifer to initiate the polymerization, a solution of methylene chloride $CH_2Cl_2$ and a coinitiator such as boron trichloride $BCl_3$ is added continuously and simultaneously to the reaction vessel. The inifer and $BCl_3$ solution thus form an initiator system. In lieu of $BCl_3$, other Friedel-Crafts acids such as $SnCl_4$, $TiCl_4$, $SbCl_6$, $FeCl_3$, and the like, can be utilized as the Friedel-Craft coinitiator.

BRIEF DESCRIPTION OF DRAWINGS

The nature of this invention and its advantages can be better understood by reference to the drawings, wherein.

BEST MODE FOR CARRYING OUT THE INVENTION

Figure 1:
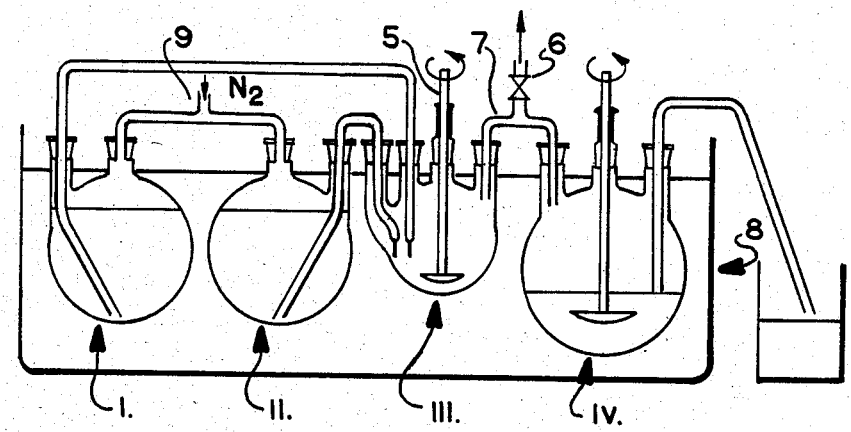
FIG. 1 is a schematic flow diagram of the apparatus used to practice our continuous process.

Although synthesis of di- and triterminally halogenated polyisobutylenes were discussed and provided for in our aforesaid patent, these methods of preparation were essentially batch-wise and therefore were not continuous in nature. This invention describes an improved truly continuous inifer polymerization process for the preparation of di- and three-arm star telechelic polyisobutylenes and related polymers and specifically the synthesis of well defined three-arm star tertiary chlorine terminated polyisobutylene polymer by this continuous technique. In this process, the first stream is prepared by chilling a suitable solvent such as methyl chloride in a suitable container to about minus 40° C. and then charging to the methyl chloride sufficient isobutylene to give a concentration of about $10^{-4}$ to $10^{-1}$ moles of isobutylene per mole of methyl chloride and then the trinifer is charged to the storage vessel, the trinifer being 1,3,5-triisopropylbenzene or TCC. This first solution or stream is charged to to the reactor simultaneously with the charge of the other or second stream, namely a solution of boron chloride in methyl chloride which has been chilled to about minus 40° C. and after about two or three residence time, the product is removed at a rate essentially equal to the rate the two feed streams are being charged to the reactor to achieve essentially a constant condition. This withdrawn product is discharged into a precipitator containing sufficient coagulating agents such as methyl alcohol to stop the polymerization and effect coagulation or precipitation of the polymer that has been formed. It is to be understood that the charged streams, that is the first and second of the charge streams, as well as the reactor is maintained under an inert atmosphere such as nitrogen or other suitable inert gases to eliminate the access of moisture to the reaction vessel. The coagulum in the coagulation vessel is properly washed to give the polymer in a manner described in U.S. Pat. No. 4,276,394. Polymers from the coagulation vessel upon analysis shows that the end groups are well defined and that the chains of each arm of the polymer is essentially uniform and have uniform length.

EXPERIMENTAL PROCEDURE

The experimental procedure used in this invention is in many respects similar or the same as that disclosed under the experimental procedure set forth at column 8 and thereafter of our U.S. Pat. No. 4,276,394. Especially this is so with regard to the preparation of isobutylene, methyl chloride, the inifers, solvents, and the other materials utilized in forming the first and second streams in our continuous reaction system. The pre-cooled solutions of boron trichloride and methyl chloride and the monomer, trinifer, TCC, and methyl chloride solutions are charged simultaneously to the reactor at the appropriate polymerization temperature, i.e., at minus 40° C. Withdrawal of the polymer from the reactor is started after about two to three residence times. The rate of withdrawal and rate of charge is adjusted until it becomes essentially constant and thus the material is being discharged from the reactor after it has had a minimum length of time within the reactor of about two residence times, and passes to the coagulation vessel to be coagulated and thereby recover the polymer from its solution in the manner described in our U.S. Pat. No. 4,276,394.

Reference to FIG. 1 shows a schematic diagram of a typical reaction system utilized in our continuous polymerization process. Referring specifically to FIG. 1, vessel 1 is the hold tank or makeup tank for preparing the first stream to be charged to the reactor. This stream comprises methyl chloride, isobutylene and the trinifer TCC. The numeral 2 designates the second stream hold or makeup vessel wherein the methyl chloride and boron chloride solution are maintained and cooled to the desired temperature. In FIG. 1, all the vessels are shown immersed within a Dry Ice kerosene tank 8 which is adjusted to the desired polymerization temperature, usually about minus 40° to minus 60° C. and thus the materials in the hold tanks 1 and 2 will be at that temperature when by use of nitrogen pressure 9 from a nitrogen pressure vessel (not shown), the first and second streams are charged to the reactor 3 which is being stirred by stirrer 5, the stirring being at a relatively rapid rate to give uniform mixing of the two streams as they come into the reactor 3. The polymer product in reactor 3 is forced from reactor 3 into vessel 4 by the N$_2$ pressure. A valve 6 in the discharge line 7 permits samples to be drawn as desired of this reaction product as it flows to the coagulation vessel 4.

Figure 2:
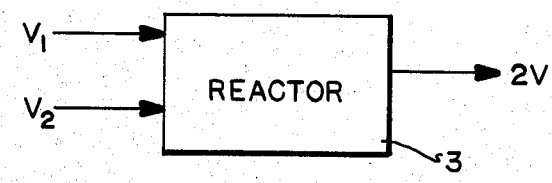
FIG. 2 is a schematic flow diagram of the streams to and from the reactor.

Although the kinetics of polymerization of isobutylene by the inifer/boron trichloride system has been repeatedly described in the literature in terms of the elementary reactions of ion generation, cationation, propagation, chain transfer to inifer, and termination, these discussions and explanations have been in regard to batch operations. We have developed the kinetics of a continuous inifer polymerization process and from an analysis of this theory, it is evident that the continuous process of our invention produces results different from the batch processes heretofore known and described, for instance that of our U.S. Pat. No. 4,276,394. The nature of the kinetic theory developed as it applies to our continuous process can be more readily appreciated and understood by reference to FIG. 2 which is a schematic version of our continuous polymerization process. Referring to FIG. 2, V$_1$ and V$_2$, respectively, designates the volumes of the first and second streams, to the reactor 3 of FIG. 1. Then the arrow to 2V designates the volume of the polymer mixture being withdrawn from the reactor and charged to coagulator tank 4. In this steady state system, V$_1$=V$_2$=V. Therefore concentration changes during polymerization may be described by the following set of differential equations:

$$\frac{d[M]}{dt} = V[M_o] - k_c[I^\oplus][M] - k_p[M_n^\oplus][M] - 2V[M] \quad (1)$$

$$\frac{d[I]}{dt} = V[I_o] - k_i[I][BCl_3] - k_{tr,i}[M_n^\oplus][I] + k_{-i}[I^\oplus] - 2V[I] \quad (2)$$

$$\frac{d[M_n^\oplus]}{dt} = k_c[I^\oplus][M] - k_{tr,i}[M_n^\oplus][I] - k_t[M_n^\oplus] - 2V[M_n^\oplus] \quad (3)$$

$$\frac{d[I^\oplus]}{dt} = k_{tr,i}[M_n^\oplus][I] - k_c[I^\oplus][M] + k_i[I][BCl_3] - k_{-i}[I^\oplus] - 2V[I^\oplus] \quad (4)$$

$$\frac{d[M_n]}{dt} = k_{tr,i}[M_n^\oplus][I] + k_t[M_n^\oplus] - 2V[M_n] \quad (5)$$

where I, M and M$_n$ are inifer, monomer and polymer, respectively, I$^\oplus$ and M$_n^\oplus$ are inifer and polymer cations, k$_i$, k$_{-i}$, k$_c$, k$_p$, k$_{tr}$, I and k$_t$ are the corresponding rate constants, and the subscript o indicates initial concentrations. Except for the additional last term is equations 1 through 5, these expressions are identical to those derived earlier. In continuous polymerization systems, under stationary conditions, the $$\frac{d[M]}{dt}, \frac{d[I]}{dt}, \frac{d[M_n^\oplus]}{dt}, \frac{d[I^\oplus]}{dt}, \text{ and } \frac{d[M_n]}{dt} = 0 \quad (6)$$

i.e., the concentrations of monomer, inifer, cations and polymer are constant.

The number average degree of polymerization is:

$$\overline{DP_n} = \frac{k_p[M_n^\oplus][M] + k_c[I^\oplus][M]}{k_{tr,i}[M_n^\oplus][I] + k_t[M_n^\oplus]} \quad (7)$$

Based on equations 1 through 7, after simplification:

$$\overline{DP_n} = \frac{[M_o]}{[I_o] - 2([I] + [M_n^\oplus] + [I^\oplus])} - \frac{2[M]}{[I_o] - 2([I] + [M_n^\oplus] + [I^\oplus])} \quad (8)$$

Under stationary conditions, the values of [M], [I], [M$_n^\oplus$] and [I$^\oplus$] are negligible in comparison with those of ]M$_o$] and [I$_o$]. Thus, the second term in equation 8 becomes negligible and the expression 2 ([I]+[M$_n^\oplus$]+[I$^\oplus$]) in the denominator of the first term of equation 8 is also negligible; thus, equation 8 simplifies to $$\overline{DP_n} = \frac{[M_o]}{[I_o]} \text{ feed} \qquad (9)$$

A series of continuous experiments were carried out and representative results of these experiments are compiled in Table I. In all experiments, the trinifer was TCC, except in the first run where it was the bromo derivative 1,3,5-tri(2-bromo-2-propylbenzene) called tricumyl bromide, for short TCB. The preparation and purification of TCB was as described in Polymer Bulletin, 11, 341-48 (1984).

After a relatively short induction period (about 2-3 residence times) needed to fill the reactor and to rinse the reactor of products formed during the nonstationary phase, the stationary phase was reached and the polymer molecular weights remained constant throughout the run. The data in Table I reflect those obtained during the latter stationary phase (after 2-3 residence times whose length depended on the input rate). The $\overline{M_n}$ of the samples were routinely determined by GPC method; the variation in the $\overline{M_n}$ data are close (±10%) to the expected (theoretical) values obtained from equation 9 and that they are lower than those determined by GPC, enhances their credibility ($\overline{M_n}$ data obtained by VPO are usually lower than those determined by GPC on account of the very high sensitivity of the VPO method toward low molecular weight impurities).

column, Table I) indicate that the amounts of unreacted monomer and inifer that prevailed in the reactor and left the same were indeed negligible.

As expected, the $\overline{M_n}$ was independent of the feeding rate at the range of from 13 to 30 ml/min.

The structure of the products has been studied by $^1$H-NMR spectroscopy. The methodology has been described in detail in Polymer Preprints, 25, 133 (1984) and Polymer Bulletin, 1, 575 (1979). According to our data, the products were free of unreacted "unfired" and/or "once-fired" end groups.

Our studies demonstrate the continuous synthesis of three-arm star tertiary-chloro capped polyisobutylenes with well defined symmetrical end groups. Reactor control is readily accomplished and undesirable by-products are absent. After a short nonstationary period, the monomer and inifer concentrations are constant in the reactor and the molecular weight of the product can be readily controlled by the rate of input of monomer and inifer. Yields are ~100 percent and molecular weight distributions ($\overline{M_w}/\overline{M_n}$) are close to theoretical.

As a solvent for the various polymerizations, we have employed methyl chloride to which some chlorobenzene could be added. Alternately, the other solvents used in these polymerizations could be used, for example, ethyl chloride, methylene chloride and related low-boiling chloro hydrocarbons and hydrocarbons such as the pentanes, cyclopentanes, and hexanes.

In another embodiment of this invention, a monomer-/inifer feed is added preferably at a continuous constant rate to a well stirred reactor with the cointiator charge.

TABLE I

Results of Continuous Polymerizations

| Ep. No. | IB mole/l | Inifer in feed mole/l | BCl$_3$ | Feed rate ml/min. | Time min. | Theor. | $\overline{M}$ Exp. GPC | VPO | $\overline{M_w}/\overline{M_n}$ | Yield % |
|---|---|---|---|---|---|---|---|---|---|---|
| 2 | 0.54 | 1 × 10$^{-2}$* | 0.10 | 16 | 60 | 3400 | 4200 | | 1.78 | ~100 |
| 6 | 0.90 | 1.3 × 10$^{-2}$ | 0.12 | 25 | 25 | | 4400 | | 1.64 | |
| | | | | | 33 | | 4500 | | 166 | |
| | | | | | 39 | | 4700 | | 1.60 | |
| | | | | | R | 4200 | 4800 | | 1.60 | ~100 |
| 7 | 1.54 | 2.3 × 10$^{-2}$ | 0.20 | 13 | 68 | | 3500 | | 1.58 | |
| | | | | | 74 | | 4600 | | 1.57 | |
| | | | | | R | 4100 | 5000 | 3700 | 1.57 | ~100 |
| 8 | 1.29 | 2 × 10$^{-2}$ | 0.20 | 18 | 69** | | 5000 | | 1.47 | |
| | | | | | 74 | | 4700 | | 1.57 | |
| | | | | | 80 | | 4700 | | 1.55 | |
| | | | | | R | 3900 | 5100 | 4300 | 1.54 | ~100 |
| 10 | 0.86 | 1.16 × 10$^{-2}$ | 0.12 | 16 | 40 | | 3700 | | 1.49 | |
| | | | | | 50 | | 4700 | | 1.44 | |
| | | | | | 55 | | 5000 | | 1.50 | |
| | | | | | 58 | | 5000 | | 1.53 | |
| | | | | | R | 4500 | 5100 | | 1.59 | ~100 |

*Trinifer TCB, R = product in reactor
** = feeding rate was increased to 30 ml/min. from this point on.

The $\overline{M_n}$ data obtained by GPC was calculated by the use of a calibration curve prepared with well fractionated linear polyisobutylene standards. This calibration curve is not exactly valid for the characterization of three-arm star polymers, however, the error due to this approximation must be small in view of the relatively low molecular weight range (3500-5000) investigated and the agreement between the select GPC and VPO data.

Molecular weight distributions (i.e., $\overline{M_w}/\overline{M_n}$=1.5-1.7) were quite close to the expected or theoretical value, $\overline{M_w}/\overline{M_n}$=1.33 for three-arm star telechelic polyisobutylenes.

Satisfactory agreement between experimental and theoretical $\overline{M_n}$s, and the close to 100 percent yields (last It is desirable in these embodiments that the coinitiator charge and the monomer/inifer charge be added simultaneously or that the coinitiator charge be present in the reactor at the start of the reaction, and then add the monomer/inifer feed continuously to get the benefits of this invention which is illustrated by the following comparative experiments.

The purpose of these examples is to outline semicontinuous reaction conditions under which perfectly symmetrical end-reactive materials can be obtained with close to theoretical molecular weight dispersities, i.e., $\overline{M_w}/\overline{M_n}$=1.5 for linear and 1.33 for three-arm star products, even at complete monomer conversions.

EXAMPLE 1

The isobutylene and methyl chloride were dried by passing the gases through columns packed with BaO and molecular sieves (4Å), condensing them under a dry nitrogen atmosphere. n-Hexane was refluxed with fuming sulfuric acid, washed with distilled water until neutral, dried over molecular sieves, refluxed, and subsequently distilled from calcium hydride under nitrogen.

Semicontinuous polymerization experiments were carried out in a stainless steel enclosure (dry box) under a dry nitrogen atmosphere in three-neck flasks equipped with overhead stirrer and an inlet for the continuous introduction of precooled inifer/isobutylene/solvent feeds to stirred, dilute $BCl_3$/solvent charges. Experiments with binifer were performed at minus 80° C. by the use of $CH_3Cl$/n-hexane solvent mixtures (80/20 v/v), with trinifer at minus 40° C. using $CH_3Cl$ solvent. The input rate was controlled by applying constant nitrogen pressure on the reservoir that contained the feed. Solvent is needed in the feed to dissolve the inifers that are sparingly soluble in isobutylene. Polymerizations were terminated by quenching with prechilled methanol.

Conventional polymerizations according to the prior art batch practice were carried out by rapidly adding the $BCl_3$ coinitiator to stirred inifer/isobutylene/solvent charges. The composition of the final charges were identical to the final composition of the corresponding semicontinuous runs. Heat evolution could often be observed in conventional batch polymerization upon $BCl_3$ addition.

The products were dissolved in n-hexane, washed with dilute aqueous HCl, distilled water, dried over anhydrous $MgSO_4$, filtered, and recovered by removing the solvent (rotovap).

Molecular weights were determined using a Waters high-pressure GPC instrument (Model 6000 A pump, a series of five μ-Styragel columns ($10^6$, $10^5$, $10^4$, $10^3$, 500 Å), Differential Refractometer 2401 and UV Absorbance Detector Model (440) and a calibration curve made by well fractionated polyisobutylene standards $^1H$ NMR spectra were taken by a Varian T-60 Spectrometer using concentrated (~20 percent) by weight carbon tetrachloride solutions and TMS standard.

Then, a series of parallel experiments were carried out using identical overall concentrations: one run was carried out by using the conventional batch technique (adding $BCl_3$ to monomer/inifer charges), and a corresponding semicontinuous experiment (adding monomer/inifer to $BCl_3$ charges). The ultimate reagent concentrations were identical in both sets of experiments. Both binifer and trinifer have been examined and various monomer/inifer ratios were used to prepare various molecular weight products. To prevent indanyl end-group formation experiments with binifer were carried out at minus 80° C. by the use of methyl chloride/n-hexane (80/20 v/v) mixed solvents. Experiments with trinifer were performed using pure methyl chloride at minus 40° C., since intramolecular ring formation leading to indanyl end groups is impossible in trinifer systems. Essentially constant [M] and [I] could be maintained by using a minimum of solvent in the feed (needed to dissolve the inifers), otherwise due to the continuous dilution of the charge [M] and [I] would have continuously decreased. The results of these experimental runs are compiled in Table II.

Polymers with molecular weight dispersities close to the theoretical values can be obtained even at 100 percent conversions by the semicontinuous technique, whereas much larger dispersities have been obtained in conventional runs. Inspection of GPC traces of products obtained in conventional batch binifer experiments showed broad distributions with a long tail toward the low molecular weight range. The GPC traces of products obtained in conventional batch trinifer experiments were broad and multimodal, conceivably due to insufficient reactor control. In contrast, effective reactor control can be maintained throughout the semicontinuous experiments, for example, due to the slow and continuous feeding of the reagents sudden heat evolution can be easily avoided.

Efforts have been made to analyze the end-groups, particularly unfired and once-fired end groups, of linear and three-arm star polyisobutylenes obtained in binifer and trinifer experiments, respectively. Confirming our earlier observations and those of other researchers, products obtained in the presence of binifer which do not exhibit unfired end-groups, however, may contain once-fired end groups.

The products obtained with trinifer by the conventional batch method contain both unfired and once-fired end groups. In contrast, the products obtained by the semicontinous technique of our invention with trinifer are unexpectedly virtually free of unfired or once-fired structures.

The molecular weight distribution of the corresponding polymer samples is also in accord with these observations. Products containing unfired or once-fired end groups would not yield theoretical $\overline{M}_w/\overline{M}_n$ values even if [M] and [I] would remain constant during the polymerization, and, similarly, unfired and once-fired end groups must be absent in products exhibiting theoretical $\overline{M}_w/\overline{M}_n$ values. Thus the absence of unfired and once-fired end groups in polymers obtained in semicontinuous experiments with trinifer is indicated by the close to theoretical $\overline{M}_w/\overline{M}_n$ values obtained and independently $^1H$ MNR spectroscopy.

Table II compares some characteristics of the semicontinous and batch techniques. According to $^1H$ NMR and GPC data, the semicontinuous technique produces polymers with well defined symmetrical end groups, while the batch polymerization yields once-fired and unfired chain ends. The $\overline{M}_w/\overline{M}_n$ values of polymers obtained in semicontinous runs are close to theoretical, whereas those harvested in conventional batch polymerization exhibit broader molecular weight distributions due to changing [I] and [M], presence of once-fired and/or unfired chain ends, and insufficient reactor control. The latter circumstance may even result in bimodal distributions.

The molecular weights of polymers formed in semicontinuous or continuous experiments are controlled by the concentration ratio [M]/[I] in the feed, while in batch polymerizations the molecular weights are controlled mostly by the reactivity of the inifer (i.e., the value of the chain transfer constant $C_I$ rendering too reactive or unreactive inifers unsuitable). In batch polymerizations complete depletion of [I] and [M] is possible only in specific cases, while in semicontinous and continuous runs both I and M are completely consumed and constant [M] and [I] are maintained. The semicontinuous and continuous techniques facilitate satisfactory reactor control, while with the conventional batch technique reactor control is difficult (i.e., heat jump on BCl₃ introduction) which is a major reason for broad or multimodal molecular weight distributions. Evidently the semicontinous and continuous techniques are superior methods for the preparation of symmetrical end-reactive polyisobutylenes by the inifer method than conventional batch polymerizations.

TABLE II

Comparison of Semicontinuous and Conventional Polymerization Techniques for the Preparation of Telechelic Polyisobutylenes by Binifer and Trinifer

| $BCl_3$ in initial charge $\underline{M} \times 10$ | IB* in feed $\underline{M}$ | Inifer $\underline{M}$ | Feed rate ml/min. | time min | $\overline{M}_n$ | $\overline{M}_w/\overline{M}_n$ |
|---|---|---|---|---|---|---|
| \multicolumn{7}{c}{Semicontinuous Binifer} |
| \multicolumn{7}{c}{Runs: $-80°$ C., $CH_3Cl/\underline{n}$-hexane solvent mixture (80/20 v/v)} |
| 1a | 1.9 | 3.7 | $2.1 \times 10^{-1}$ | 11 | 6 | 980 | 2.0 |
| 2a | 1.6 | 5.0 | $1.5 \times 10^{-1}$ | 8 | 92 | 2000 | 1.8 |
| 3a | 4.7 | 3.3 | $6.5 \times 10^{-1}$ | 10 | 6 | 2900 | 1.8 |
| \multicolumn{7}{c}{Semicontinuous Trinifer Runs: $-40°$ C., $CH_3Cl$} |
| 4a | 4.7 | 6.4 | $1.7 \times 10^{-1}$ | 15 | 2.5 | 2500 | 1.4 |
| 5a | 4.7 | 4.0 | $6.8 \times 10^{-2}$ | 21 | 2.1 | 3900 | 1.5 |
| 6a | 4.7 | 6.0 | $5.2 \times 10^{-2}$ | 7 | 8 | 6700 | 1.3 |
| 7a | 4.7 | 6.0 | $4.1 \times 10^{-2}$ | 11 | 5.1 | 8200 | 1.3 |

| $BCl_3$ $\underline{M} \times 10$ | IB* $\underline{M}$ | Inifer | $\overline{M}_n$ | $\overline{M}_w/\overline{M}_n$ |
|---|---|---|---|---|
| \multicolumn{5}{c}{Conventional Binifer (Batch) Runs:} |
| \multicolumn{5}{c}{$-80°$ C., $CH_3Cl/\underline{n}$-hexane solvent mixture (80/20 v/v)} |
| 1b | 1.6 | 0.8 | $4.5 \times 10^{-2}$ | 900 | 3.6 |
| 3b | 3.1 | 1.3 | $2.6 \times 10^{-2}$ | 3200 | 3.0 |
| \multicolumn{5}{c}{Conventional Trinifer (Batch) Runs: $-40°$ C., $CH_3Cl$ solvent} |
| 4b | 3.3 | 1.7 | $4.6 \times 10^{-1}$ | ** |
| 5b | 3.2 | 1.2 | $2.0 \times 10^{-1}$ | ** |
| 6b | 2.9 | 2.1 | $1.8 \times 10^{-1}$ | ** |

*Monomer conversion was 100 percent
**Multimodal molecular weight distribution

Although the reactor has been illustrated in the drawings as a single vessel, those of ordinary skill in the art appreciate a pipe type reactor can be used with this invention.

While in accordance with the patent statutes, a preferred embodiment and best mode has been set forth in detail, the scope of the invention is limited by the scope of the attached claims.

What is claimed is:

1. A process for the synthesis of essentially symmetrical telechelic polyisobutylenes containing only tert-halogen end groups and free of unfired or once-fired end groups comprising the steps of:
   continuously charging a monomer-inifer solvent stream to a reactor to maintain a constant monomer and inifer concentration in said reactor during polymerization, said reactor either being charged with a stream of a metal halide Friedel-Crafts acid coinitiator in a solvent ahead of said monomer-inifer solvent stream or simultaneously with the charging of said monomer-inifer solvent stream and either adjusting the rate of charge of the monomer-inifer solvent feed to the reactor to maintain said monomer and inifer concentration essentially constant where the metal halide is charged first or withdrawing reaction product continuously and simultaneously at a volume essentially equal to said charged streams where the feeds are charged to the reactor simultaneously and continously;
   said inifer being selected from the group consisting of $AY_n$, BZ, and oligomers of alphachlorostyrene having from 2 to 6 units;
   where A is selected from the group consisting of condensed and noncondensed aromatic compounds having from 1 to 4 rings, and linear and branched aliphatic compounds having from 3 to 20 carbon atoms;
   where Y is represented by the formula

where R and R' are selected from the group consisting of hydrogen, methyl, and phenyl, and R and R' can be the same when A is an aromatic compound, or where R is phenyl when A is an aliphatic compound;
   where X is a halogen selected from the group consisting of fluorine, chlorine, and bromine, and where n is an integer from 2 to 6; and where B is selected from hydrocarbons having from 8 to 20 carbon atoms, and where Z is a tertiary halogen selected from the group consisting of tertiary fluorine, tertiary chlorine, or tertiary bromine.

2. The process of claim 1 wherein the monomer is isobutylene and the inifer is selected from the class consisting of p-DCC, TCC, and TCB.

3. The process of claim 1 wherein the product is essentially free of unfired or once-fired end groups.

4. A process as set forth in claim 1 wherein the inifer is a compound of the formula $AY_n$.

5. A process as set forth in claim 1 wherein the inifer is tricumyl chloride or bromide.

6. A process as set forth in claim 1 wherein the Friedel-Crafts acid coinitiator is $BCl_3$.

7. A process as set forth in claim 1 wherein the solvent is selected from the group consisting of methyl chloride, methylcyclohexane, n-pentane and chlorobenzene, and mixtures thereof.

8. The process of claim 1 wherein the polymerization occurred at minus 10° to minus 80° C.

9. The process of claim 2 wherein the polymerization occurred at minus 10° to minus 80° C.

10. The process of claim 1 wherein the inifer concentration is about $10^{-1}$ to $10^{-4}$ moles per mole of monomer.

11. A process for the synthesis of telechelic halogenated polymers comprising the steps of:
    simultaneously and continuously charging to a reactor a first and second stream to polymerize said monomer to telechelic halogenated polymer and withdrawing from the reactor continuously, a reaction product stream essentially equal in volume to the sum of the first and second stream;
    said first stream comprising a cationically polymerizable olefin monomer having from about 4 to about 12 carbon atoms per molecule and an inifer concentration of from about $10^{-5}$ to about $10^1$ moles per mole of said monomer and the second stream comprising a solution of a fully chlorinated metal chloride Friedel-Crafts acid coinitiator in a solvent;
    said inifer being selected from the group consisting of $AY_n$, BZ, and oligomers of alphachlorostyrene having from 2 to 6 units;

where A is selected from the group consisting of condensed and noncondensed aromatic compounds having from 1 to 4 rings, and linear and branched aliphatic compounds having from 3 to 20 carbon atoms;

where Y is represented by the formula $$\begin{array}{c} R \\ | \\ -C-X \\ | \\ R' \end{array}$$

where R and R' are selected from the group consisting of hydrogen, methyl, and phenyl, and R and R' can be the same when A is an aromatic compound, or where R is phenyl when A is an aliphatic compound;

where X is a halogen selected from the group consisting of fluorine, chlorine, and bromine, and where n is an integer from 2 to 6; and where B is selected from hydrocarbons having from 8 to 20 carbon atoms, and where Z is a tertiary halogen selected from the group consisting of tertiary fluorine, tertiary chlorine, or tertiary bromine.

12. The process of claim 11 wherein the monomer is isobutylene and the inifer is selected from the class consisting of p-DCC, TCC, and TCB.

13. The process of claim 11 wherein the product is essentially free of unfired or once-fired end groups.

14. A process as set forth in claim 11 wherein the inifer is a compound of the formula $AY_n$.

15. A process as set forth in claim 11 wherein the inifer is tricumyl chloride or bromide.

16. A process as set forth in claim 11 wherein the Friedel-Crafts acid coinitiator is $BCl_3$.

17. A process as set forth in claim 11 wherein the solvent is selected from the group consisting of methylene chlorine, methylcyclohexane, n-pentane and chlorobenzene, and mixtures thereof.

18. A process of claim 11 wherein the coinitiator in solvent is charged to the reactor ahead of the monomer-inifer solvent stream.

19. The process of claim 11 wherein the metal halide is a chloride.

* * * * *